(12) United States Patent
Abouodah

(10) Patent No.: US 7,056,060 B2
(45) Date of Patent: Jun. 6, 2006

(54) APPARATUS AND METHOD FOR REMEDIATION OF LOW PERMEABILITY FORMATIONS

(76) Inventor: Mohamed Abouodah, 14013 Garnett St., Overland Park, KS (US) 66221

( * ) Notice: Subject to any disclaimer, the term of this patent is extended or adjusted under 35 U.S.C. 154(b) by 0 days.

(21) Appl. No.: 10/960,805

(22) Filed: Oct. 7, 2004

(65) Prior Publication Data

US 2005/0074290 A1  Apr. 7, 2005

Related U.S. Application Data

(60) Provisional application No. 60/509,390, filed on Oct. 7, 2003.

(51) Int. Cl.
*E21B 37/00* (2006.01)
(52) U.S. Cl. ..................... 405/128.1; 166/112
(58) Field of Classification Search ................ 166/306, 166/106, 112
See application file for complete search history.

(56) References Cited

U.S. PATENT DOCUMENTS

| | | | | |
|---|---|---|---|---|
| 719,004 | A * | 1/1903 | Hoffman | 166/111 |
| 2,187,486 | A * | 1/1940 | Burt | 166/106 |
| 2,910,002 | A * | 10/1959 | Morgan | 166/54.1 |
| 3,046,904 | A * | 7/1962 | Crow | 166/106 |
| 3,143,968 | A * | 8/1964 | Gallaway et al. | 166/106 |
| 3,548,946 | A * | 12/1970 | Engle | 166/310 |
| 6,352,387 | B1 * | 3/2002 | Briggs et al. | 166/306 |

* cited by examiner

*Primary Examiner*—John Kreck
(74) *Attorney, Agent, or Firm*—Shughart Thomson & Kilroy PC

(57) ABSTRACT

An apparatus and method for treating contaminated groundwater in low permeability ground formations is provided having a groundwater intake region at the bottom of the well and a groundwater expulsion region above the bottom of the well and a means for moving the water therebetween.

10 Claims, 3 Drawing Sheets

APPARATUS AND METHOD FOR REMEDIATION OF LOW PERMEABILITY FORMATIONS

CROSS REFERENCE TO RELATED APPLICATION

This application claims priority to U.S. Provisional Application No. 60/509,390 filed Oct. 7, 2003.

FIELD OF THE INVENTION

The present invention related to the removal of contaminants from underground soil and water. In particular the present invention relates to an apparatus and method for removing contaminants from underground soil and water in which the soil is a low permeability formation such as, for example, a clay formation using a well emplaced into the low permeability formation to withdraw water from the formation at the well bottom and to treat the water within the well and then inject the treated water back into the formation an upper level of the well from the well bottom.

BACKGROUND OF THE INVENTION

Subsurface remediation of sites consisting of low permeability (tight) geological formations has been challenging tasks for environmental professionals. These soils usually refer to deposits consisting of consolidated clay material where acceptable vapor and groundwater flow movements cannot be achieved. As a result, corrective measures suitable to remedy tight soils are few in number and continue to have significant shortcomings.

Most commonly implemented groundwater remedial options are based on extraction of contaminated water for treatment at the surface or within the well, or injection of treatment chemical compounds to contaminants location. Unfortunately, neither of the currently existing processes is effective in low permeability formations.

For extraction methods to be effective, the remediation site must present high hydraulic conductivity that allows for movement of adequate volumes of groundwater. In most low permeability formations, groundwater extraction from a well may not exceed a fraction of a gallon per minute. Measures to enhance groundwater flow, including high vacuum enhanced extraction, have been attempted. These measures can be effective in increasing groundwater extraction rate. However, these measures when effective will result in the need to remedy and dispose of a large volume of water. This can be costly and maintenance demanding.

Other difficulties and limitations are presented by the groundwater extraction method approach to remediation of groundwater. For example, when the water table is deeper than 25 feet below the surface of the ground, the use of high vacuum extraction alone is not effective for pollution remediation. Such cases require the use of expensive and maintenance demanding liquid ring, high vacuum blowers to exert high vacuum forces in the well and on groundwater surrounding the well.

Another limitation of the groundwater extraction methods and devices is their radius of influence—the distance around the well on which the well has its beneficial effect—is usually less than 15 feet and may be as small as 3 feet. The prior art groundwater extraction devices and method require that a large number of wells be emplaced to effectively treat the polluted ground water. In cases in which it is necessary to actually remove the extracted groundwater from the well for treatment on the surface, the remediation costs are increased. Further, the prior art groundwater extraction methods present no suitable methods for treatment of polluted groundwater that is contained in tight or low permeability ground formations. The application of high vacuum in wells may result in creating fractures in the soil surrounding the well thereby presenting preferential pathways for vapor and groundwater movement toward the well resulting in treatment of only limited portions of the groundwater near the well.

Injection based groundwater remedies are based on forcing treatment compounds under high pressure into the ground to reach contaminated groundwater in-situ. A number of difficulties are associated with injection-based technologies. These include the potential for spreading contaminants from polluted areas into clean areas; the potential for injected chemicals to remain localized when injected into fractured rock formations; the consumption of significant volumes of the injected chemicals by natural soil constituents; and the ineffectiveness of such injection methods when the contaminants are present at low concentration.

Injection methods also may require high injection forces which are likely to result in destruction of soil matrix resulting in additional soil consolidation, which further limits the potential of movement of injected fluids. In addition, the high pressure may result in soil heaving and the dispersal of injected materials to the upper layers of soil into the vadose zone. Further, the expense of injection methods can be very high for situations in which several injection applications are needed. Large volumes of chemicals may be necessary to achieve acceptable reduction, and as injection methods tend to provide a small radius of influence, an extensive array of injection points may be necessary.

Therefore, as currently available tight formation, or low permeability formation, remedial measures are of limited effectiveness at most sites, it would be of great benefit if an in-well treatment technology, capable of exerting forces adequate to extract groundwater into the well and inject it back in the same well after treatment were available.

The present methods of dealing with groundwater remediation also include circulation well technology. The circulation technology method combines in-situ air stripping, air-sparging, soil vapor extraction and enhanced bioremediation oxidation in a wellhead system. The system is designed for inclusion in a well of at least four inches in diameter and is highly cost effective when compared with other, stand-alone remediation technologies. An example of this type of method is shown in U.S. Pat. No. 6,557,633, to Abouodah, the specification of which is incorporated herein by reference.

The air-sparging component results in lifting the water table. This lifting of the water in the well causes a net reduction in head at the well location, which results in water flowing toward the well. Vacuum pressure (the vapor extraction component) is applied atop of the well point to extract vapor from the subsurface. The negative pressure from vacuum extraction results in water suction that creates additional water lifting (mounding) and a net lower gradient. This further enlarges the radius of influence of the well.

A submersible pump is placed at the bottom of the well to recirculate water to a point above the mounded groundwater downward spray through a spray head. The water cascades down the interior of the well and counter flow to the vapor extraction similar to what occurs in an air-stripping tower. Enhanced stripping via air-sparging near the bottom of the well will occur simultaneously. In essence, the well will act as a subsurface air-stripping tower. In addition to the air stripping effected by the pumping/cascading, a portion of the pumped, stripped, highly aerated water will flow down well annulus and over the mounded groundwater back in to the aquifer, thus creating a circulation zone surrounding the well. These combined effects, in concert will accelerate and further enhance cleanup. Effects of the different forces on the groundwater table in relation to the wellhead technology are shown in FIG. 1.

In summary, contaminants are stripped from water as a result of the combined effects in-well air stripping and in-well air sparging. The radius of influence, or the groundwater cleaning zone, will be created by a combination of negative gradient as a result of air-sparging, additional, negative gradient resulting from the application of vacuum extraction, and subsurface water circulation induced by a submersible pump. All of these different components can be integrated and installed in a 4-inch groundwater well. Cost of this technology is in the range of the cost of air-sparging technology alone; since the costs of added pump and piping will be compensated for by the elimination of a separate vapor extraction point and associated trenching and construction.

Previous known circulating well technologies include the NoVOC™ and Underduck-Verdampfer-Brunnen (UVB) technologies. In the NOVOC™ technology, a blower introduces air to produce bubbles in a sparging well. The well is equipped with a deflector plate that separates two screens. When the sparged air encounters the deflector plate, the bubbles break, re-combine and then re-infiltrate the vadose zone to be extracted through the upper screen. With the UVB technology, airlift pumping occurs in response to negative pressure induced at the wellhead by a blower. Vacuum draws water into the well through the lower screen. As a result, air is introduced through a diffuser plate located within the upper, screened section. The air bubbles provide airlift pump effect that moves water up in the well. A submersible pump is installed to insure that water flows from bottom to top. A stripping reactor consisting of fluted and channeled columns is installed to facilitate transfer of volatile compounds to the gaseous phase.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DESCRIPTION OF THE PREFERRED EMBODIMENT

Generally, the method of the present invention comprises four steps: exerting a sufficient vacuum to pull polluted groundwater into a well from a desired extraction zone adjacent a well; treating the groundwater with selected remedial measures appropriate for the particular pollutant found at the well location; transferring the treated water within the well casing to a desired injection zone within the well casing; and applying adequate pressure to inject treated groundwater across the injection zone and back into the formation at the proper elevation within the well.

The present invention is based on a novel concept to enhance water flow into and out of the well. The concept utilized in the present invention also may be likened to a piston pump where the well casing forms the piston chamber with the intake port being at the bottom of the well and the exhaust port being positioned along the well casing at a point above the bottom of the well.

Figure 1:
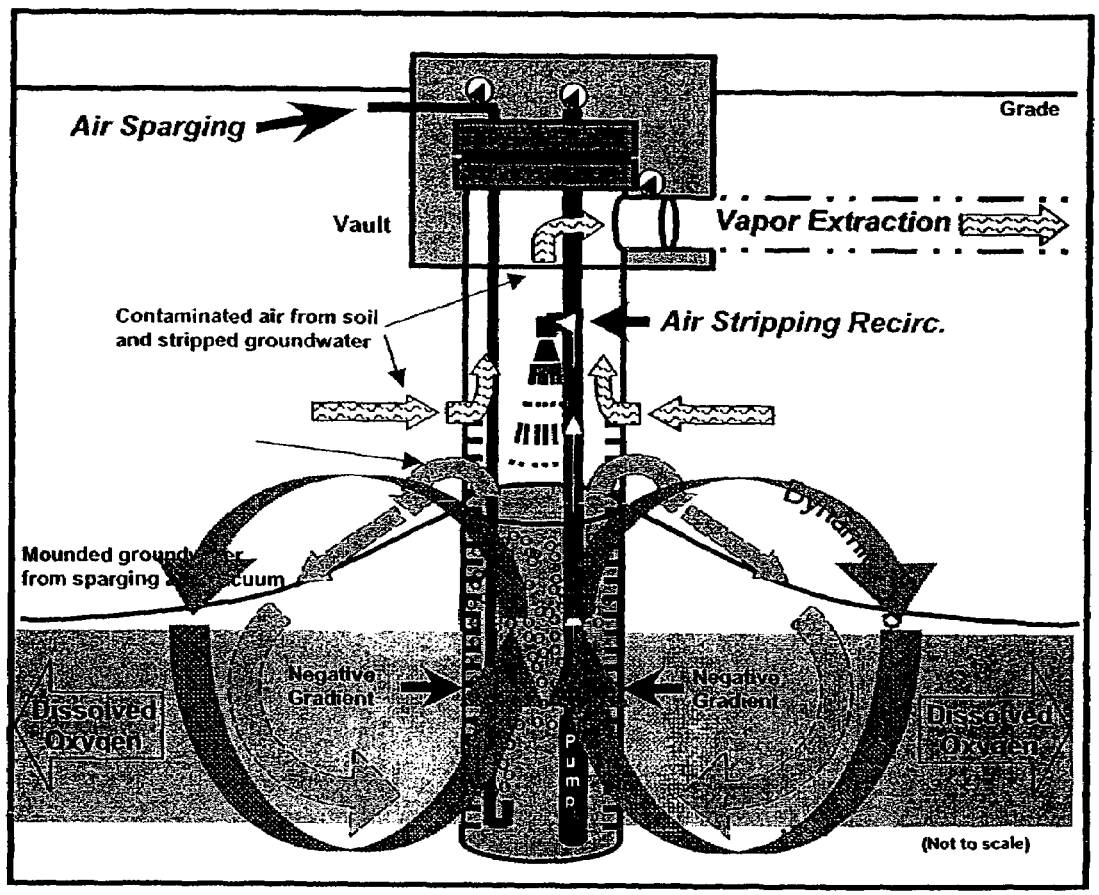
FIG. 1 is a diagrammatic representation of the groundwater treatment and flow characteristics of a typical circulating well for remediation of groundwater.
Figure 2:
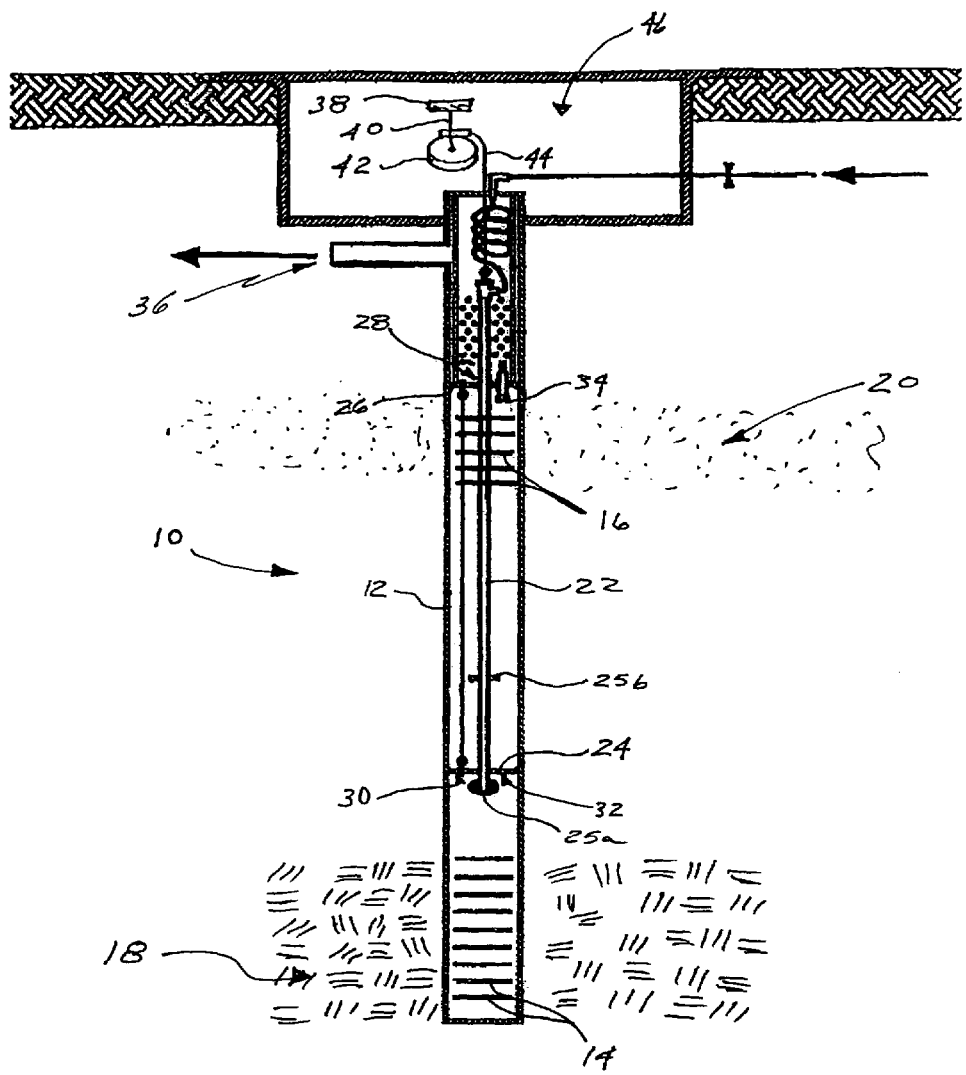
FIG. 2 is cross section elevation of the present invention.

Referring now to FIG. 2, well 10 is provided with a well casing 12 which acts in similar fashion as the outer cylinder of the piston pump. In a preferred embodiment, a 4-inch diameter well or larger, and preferably a 6-inch diameter well, is used. The well casing 12 is provided with two separate screens 14,16 at different elevations. The lower screen 14 is positioned on the well casing 12 adjacent the contaminated groundwater zone 18. The upper screen 16 is positioned above the lower screen and is located near the water table or the desired injection zone 20 along the height of the well casing 12.

Inside the well casing 12 is located a moving shaft 22 to which is connected a disk 24. Disk 24 is initially positioned near the top of lower screen 14. A second disk 26 is fixed in position adjacent the top of the upper screen 26. The shaft 22 is movable and is urged, alternately, upwardly and downwardly through a void 28 in disk 26 which permits the upper portion of shaft 22 to be positioned above disk 26. When disk 24 is pulled upward during the upward movement of shaft 22, the space between the moving disk 24 and the fixed disk 26 is gradually reduced. Disks 24, 26 may be comprised of plastic or metal and sized to allow free movement within the well case 12. During upward movement, disk 24 is urged upwardly by collar 25a which is attached to shaft 22 at a point below disk 24. During downward movement, disk 24 is urged downwardly by collar 25b which is attached to shaft 22 at a point above disk 24.

Disks 24, 26 fit snuggly within well casing 12 as shown in FIG. 2. As the shaft 22 is pulled upwardly, a vacuum is created in the area of the well below disk 24 which assists in drawing contaminated groundwater into well 10. The vacuum force measured in laboratory testing exceeded seven (7) inches of mercury and may be significantly higher in actual implementations of the embodiment. Also, as the shaft 22 is pulled upwardly, and at the same time, a pressure is created on the water captured between disks 24 and 26. This pressure forces the water that is captured between disks 24 and 26 out of the upper screen 16 and away from the high pressure in the casing 12 in area of upper screen 16. While the pressure is easily controlled and manipulated through the forces applied in lifting the shaft 22 and distances that disk 24 is allowed to travel, a very high pressure may be achieved. When the shaft 22 is in downward movement, a void 30 is opened in disk 24 which allows water to move from below disk 24, past disk 24 and into the space between disks 24 and 26 for repetition of the process.

Treatment of the pollutants contained in the groundwater is accomplished by continuous air-sparging which is achieved by injecting air into shaft 22 and into attached disk 24 for the release of the air from diffusing apertures 32 near the upper side of disk 24. The air is continuously sparged into the groundwater to strip contaminants from groundwater and to increase dissolved oxygen (DO) concentration in the groundwater. A check valve 34 is installed in disk 26 to permit air to seep upwardly through disk 26 for removal by take-off vent 36. When treated water reaches disk 26, a floating ball in the valve 34 blocks the passage of water through disk 26. Any contaminants contained in the air that seep past disk 26 are extracted via vacuum extraction applied to take-off vent 36 positioned near the top of the well 10.

In one embodiment, shaft 22 is reciprocated up and down by movement means. In one embodiment, a motor 38 is connected to a small shaft 40 that is connected to a cable wheel 42. A cable 44 is wound and unwound about the cable wheel 42 as the shaft 22 and disk 24 are raised and lowered. Standard electrical switches are connected to the motor to relay messages to the motor to move, stop or turn. The motor and cable are placed in a small manhole at the wellhead 46 of well 10.

Figure 3:
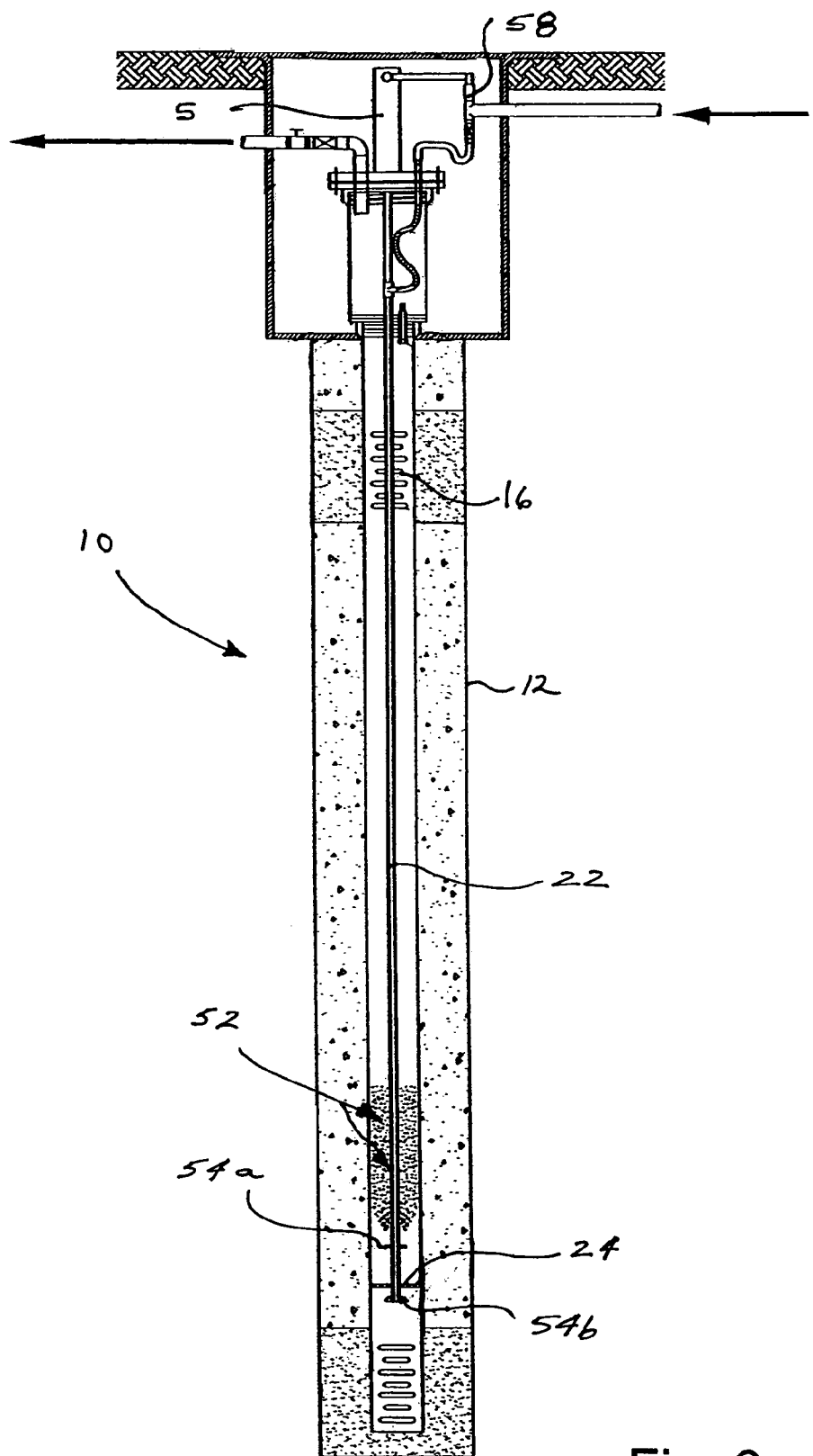
FIG. 3 is a cross section elevation of an alternate embodiment of the invention in which a compressed air source is included to provide sparging air and to operate a pneumatic cylinder to movement of the rod having the lower disk attached thereto.

Referring now to FIG. 3 an alternate embodiment of the invention is shown in which shaft 22 is provided with voids 52 to allow air-sparging to take place from the shaft 22 instead of lower disk 24. In this embodiment lower disk 24 may or may not have the air-sparging voids 32. In the embodiment of FIG. 3, lower disk 24 is captured between top and bottom stops 54a, 54b which restrict the movement of disk 24 on shaft 22. In the embodiment of FIG. 3, disk 24 is moveable along shaft 22 between top stop 54a and bottom stop 54b. In this fashion, disk 24 can be sufficiently loosely mounted on shaft 22 to permit water flow upwardly between disk 24 and shaft 22 as shaft 22 is on its downward stroke into the ground water which has flowed into well 12. On the upward stroke of shaft 22, disk 24 is contacted by bottom stop 54b which serves to seal the space between disk 24 and shaft 22 thereby preventing water flow past disk 24 during the upward stroke and allowing compression to be caused on the upward stroke to force treated water out of the well through upper screen 16. The embodiment of FIG. 3 also provides an alternate means of movement of shaft 22 which is the use of a pneumatic cylinder 56 which is mounted atop shaft 22 to provide the reciprocating motion for shaft 22.

In the embodiment of FIG. 3, the pneumatic cylinder is operated by air from a compressor which also provides air for the air sparging of the embodiment. A valve 58 is provided in the airline to cylinder 56 which can be a solenoid valve or other valve capable of operating between open and closed positions to effect the operating stroke of pneumatic cylinder 58. It will be appreciated by those skilled in the art that other suitable means of effecting reciprocating motion of shaft 22 are available such as a mechanical arm mounted on a rotating wheel to effect up and down movement of the arm which would in turn communicate up and down movement of shaft 22. The velocity of the reciprocation can, of course, be controlled by the speed of rotation of the wheel. It will also be appreciated that a screw drive could be used to cause reciprocation of shaft 22.

The inventive apparatus and method provide numerous advantages over the prior art. The apparatus and method provide a solution to remediation of groundwater in low permeability formations where remedial options are almost non-existent. As in the inventive method, there is no groundwater extraction above ground surface, there is no "on surface" treatment of water and disposal of contaminants or the obtaining of permits and periodic sampling of the above ground treatment site and resultant byproducts The method and apparatus provide high vacuum extraction and high-pressure injection at the specifically desired zone of the well at the desired ground elevation. No high vacuum pumps are used which require extensive operation and maintenance. The same device is used to inject water that is used to treat the water. Groundwater extraction rate, treatment time, lifting elevation, injection zone and velocity can be easily tailored and adjusted for the particular application. Biofouling and screen efficiency loss are unlikely due to high extraction pressure and injection force, which destroy bacterial or mineral buildups. The pumping and injection mechanism is highly efficient and minimal maintenance is required. Extraction and injection cycles will result in flushing of contaminants from soil matrix above and below water table levels. Air sparging occurs in a chamber in the well for as long as desired resulting in effective groundwater treatment. The sparging will boost dissolved oxygen (DO) in the groundwater to enhance aerobic degradation and oxidization. The apparatus and process are very simple process and low risk. The process is applicable to single well and multiple well technologies. The apparatus and method can be used to distribute amendments to accelerate remediation of recalcitrant compounds. The apparatus and method involve no complicated components.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described.

Certain changes may be made in embodying the above invention and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive oral fluid collection device is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

The invention claimed is:

1. An apparatus for treating polluted groundwater comprising:
   a well casing,
   a shaft mounted coaxially in said casing,
   means for vertical reciprocating movement of said shaft within said casing,
   upper and lower voids in said casing permitting groundwater movement through said casing said lower void permitting entry of around water into said casing,
   a first disk mounted on said shaft for slidable movement of said shaft therethrough, said first disk providing a seal of said casing above said voids,
   a second disk mounted on said shaft said second disk providing a lower seal of said casing said vertical reciprocating movement of said second disk on said shaft forces groundwater in said casing upwardly for expulsion through said upper casing voids.

2. The apparatus of claim 1 further comprising a longitudinal void the length of said shaft for passage of a gas therethrough and exit ports on said shaft for release of said gas into said groundwater in said casing.

3. The apparatus of claim 1 comprising a longitudinal void in said shaft for passage of a gas therethrough for communication of said gas to said second disk for release of said gas into said groundwater in said casing from said second disk.

4. The apparatus of claim 1 wherein said reciprocating movement is provided by a pneumatic cylinder mounted on said shaft.

5. The apparatus of claim 1 wherein said reciprocating movement is provided by a screw drive mounted on said shaft.

6. An apparatus for treating polluted groundwater comprising:
   a well casing having upper and lower voids therein for passage of groundwater therethrough said lower void permitting entry of ground water into said casing,
   a shaft coaxially mounted in said casing,
   a drive attached to said shaft for vertical reciprocating movement of said shaft within said casing,
   an upper seal mounted in said casing above said voids and having a void therein for slidable movement of said shaft therethrough,
   a lower seal mounted on said shaft said lower seal forcing groundwater located in said casing above said lower seal upward during upward reciprocating movement of said shaft to force groundwater in said casing upwardly for expulsion through said upper casing voids.

7. The apparatus of claim 6 further comprising a longitudinal void in said shaft for passage of a gas therethrough and exit ports on said shaft for release of said gas into said groundwater in said casing.

8. The apparatus of claim 6 comprising a longitudinal void in said shaft for passage of a gas therethrough for communication of said gas to said lower seal for release of said gas into said groundwater in said casing from said lower seal.

9. The apparatus of claim 6 wherein said reciprocating movement is provided by a pneumatic cylinder mounted on said shaft.

10. The apparatus of claim 6 wherein said reciprocating movement is provided by a screw drive mounted on said shaft.

* * * * *